(12) United States Patent
Herzl et al.

(10) Patent No.: US 8,341,588 B2
(45) Date of Patent: Dec. 25, 2012

(54) SEMICONDUCTOR LAYER FORMING METHOD AND STRUCTURE

(75) Inventors: Robert D. Herzl, South Burlington, VT (US); Robert S. Horton, Colchester, VT (US); Kenneth A. Lauricella, Colchester, VT (US); David W. Milton, Underhill, VT (US); Clarence R. Ogilvie, Huntington, VT (US); Paul M. Schanely, Essex Junction, VT (US); Nitin Sharma, South Burlington, VT (US); Tad J. Wilder, South Hero, VT (US); Charles B. Winn, Colchester, VT (US)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 12/897,021

(22) Filed: Oct. 4, 2010

(65) Prior Publication Data

US 2012/0083913 A1 Apr. 5, 2012

(51) Int. Cl.
*G06F 15/04* (2006.01)
*G06F 17/50* (2006.01)
(52) U.S. Cl. ......... 716/139; 716/111; 716/112; 716/119
(58) Field of Classification Search .................. 716/111, 716/112, 119, 139
See application file for complete search history.

(56) References Cited

U.S. PATENT DOCUMENTS

| | | | |
|---|---|---|---|
| 4,805,683 A | 2/1989 | Magdo et al. | |
| 6,031,981 A | 2/2000 | Lee et al. | |
| 6,629,309 B1 * | 9/2003 | Allen, III | 716/121 |
| 6,823,499 B1 * | 11/2004 | Vasishta et al. | 716/115 |
| 7,034,384 B2 * | 4/2006 | Tsai | 257/678 |
| 7,102,237 B1 * | 9/2006 | Dellinger | 257/773 |
| 7,137,094 B2 * | 11/2006 | Tien | 716/119 |
| 7,272,810 B2 * | 9/2007 | Orita | 326/80 |
| 7,313,775 B2 | 12/2007 | Casey et al. | |
| 7,343,570 B2 | 3/2008 | Bowers et al. | |
| 7,360,178 B2 | 4/2008 | Savage et al. | |
| 7,373,629 B2 | 5/2008 | McGrath et al. | |
| 7,389,484 B2 | 6/2008 | Andreev et al. | |
| 7,480,888 B1 * | 1/2009 | Ogilvie et al. | 716/101 |
| 7,523,436 B2 * | 4/2009 | Mizuno et al. | 716/50 |
| 7,698,680 B2 * | 4/2010 | Kim | 716/129 |
| 7,725,865 B2 * | 5/2010 | Oba | 716/137 |
| 7,805,701 B1 * | 9/2010 | Xin-LeBlanc | 716/55 |
| 7,965,107 B2 * | 6/2011 | Ciccarelli et al. | 326/101 |
| 2005/0028126 A1 * | 2/2005 | Kan et al. | 716/17 |
| 2005/0235240 A1 * | 10/2005 | Tien | 716/11 |
| 2007/0234264 A1 * | 10/2007 | Ono | 716/11 |
| 2008/0029786 A1 * | 2/2008 | Fan | 257/209 |

(Continued)

*Primary Examiner* — Nha Nguyen
(74) *Attorney, Agent, or Firm* — Schmeiser, Olsen & Watts; Richard Kotulak

(57) ABSTRACT

A method of forming and electrical structure. The method includes determining that a first semiconductor device requires an engineering change order (ECO). An additional structure layer required to implement the ECO is determined. A first insertion point location for inserting the additional structure layer within the first semiconductor device is selected. The first insertion point location is associated with a second insertion point location within a design for a second semiconductor device. The second semiconductor device is generated in accordance with the first ECO. The second semiconductor device comprises second structures. The second structures comprise same structures as first structures in the first semiconductor device. The second structures are formed in locations within the second semiconductor device that are associated with locations in the first semiconductor device comprising the first structures. The second semiconductor device comprises the additional structure layer located within the second insertion point location.

19 Claims, 5 Drawing Sheets

U.S. PATENT DOCUMENTS

2008/0201682 A1* 8/2008 Shigyo et al. .................. 716/13
2009/0070727 A1* 3/2009 Solomon ........................ 716/16
2010/0050142 A1* 2/2010 Dirks et al. ..................... 716/6
2010/0231256 A1* 9/2010 Jain et al. ....................... 326/41
2011/0302542 A1* 12/2011 Bernstein et al. .............. 716/110
2012/0001655 A1* 1/2012 Ciccarelli et al. ............. 326/103

* cited by examiner

SEMICONDUCTOR LAYER FORMING METHOD AND STRUCTURE

FIELD OF THE INVENTION

The present invention relates to a method for forming layers within a modified electrical structure.

BACKGROUND OF THE INVENTION

Forming structures within a device typically comprises a complicated process with limited flexibility. Accordingly, there exists a need in the art to overcome at least one of the deficiencies and limitations described herein above.

SUMMARY OF THE INVENTION

The present invention provides a method comprising:

inspecting first structures within a first semiconductor device;

determining based on said inspecting said first structures, that said first semiconductor device requires a first engineering change order (ECO);

determining a first additional structure layer required to implement said first ECO;

selecting a first insertion point location within said first semiconductor device for inserting said first additional structure layer;

associating said first insertion point location with a second insertion point location within a design for a second semiconductor device, wherein said second semiconductor device is associated with said first semiconductor device; and generating said second semiconductor device in accordance with said first ECO, wherein said second semiconductor device comprises second structures, wherein said second structures comprise same structures as said first structures, wherein said second structures are formed in locations within said second semiconductor device that are associated with locations in said first semiconductor device comprising said first structures, wherein said second semiconductor device comprises said first additional structure layer, wherein said first additional structure layer comprises first electrically conductive structures formed within a first insulator layer, wherein said first additional structure layer is located within said second insertion point location, and wherein said first electrically conductive structures are electrically connected to a first group of structures of said second structures.

The present invention advantageously provides a simple structure and associated method for forming structures within a device.

DETAILED DESCRIPTION OF THE INVENTION

Figure 1:
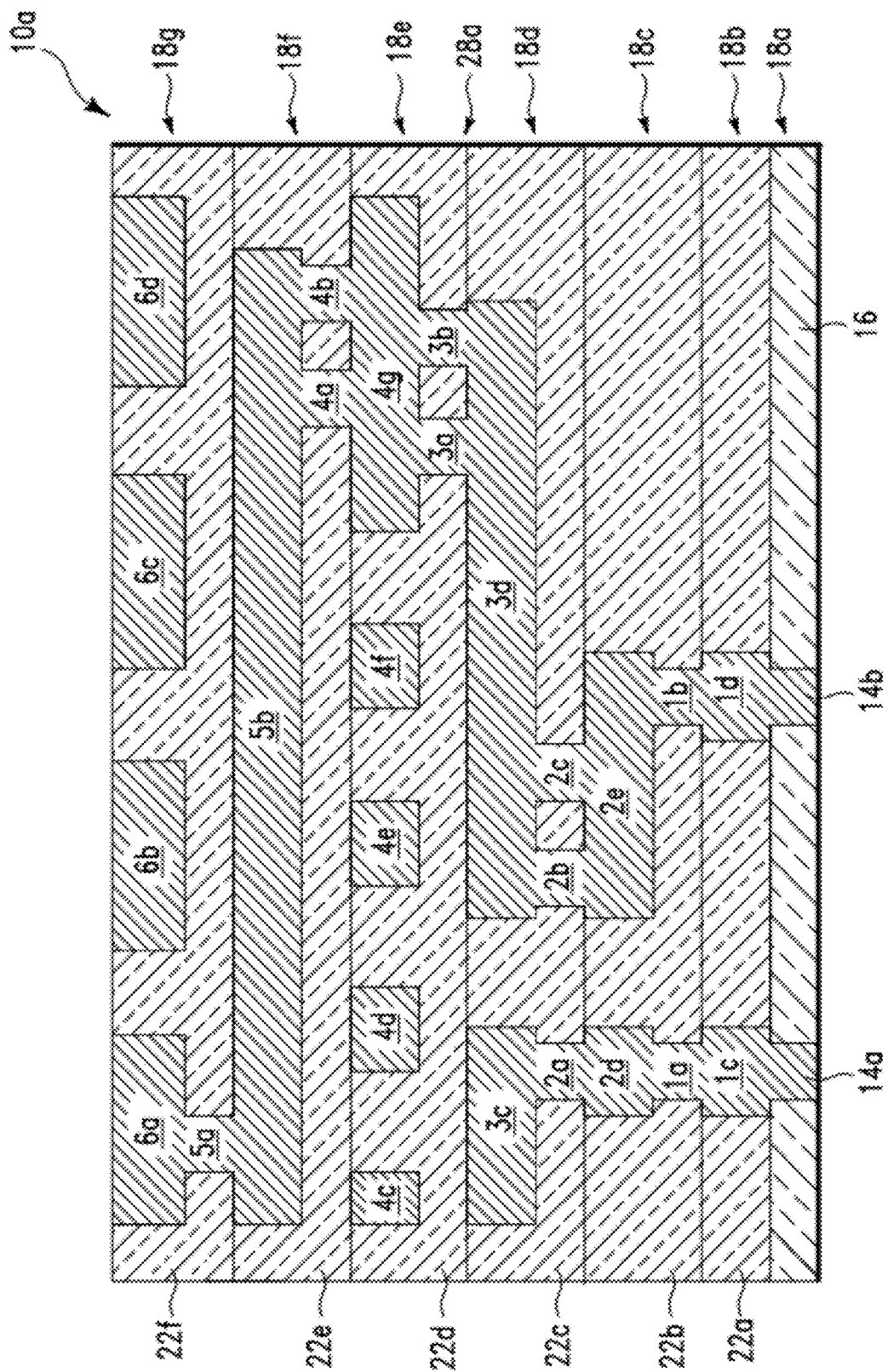
FIG. 1 illustrates a cross sectional view of a first semiconductor structure, in accordance with embodiments of the present invention.

FIG. 1 illustrates a cross sectional view of a semiconductor structure 10a, in accordance with embodiments of the present invention. Semiconductor structure 10a may comprise any semiconductor structure known to a person of ordinary skill in the art including, inter alia, a semiconductor device, a semiconductor chip, etc. Note that semiconductor structure 10a comprises a small portion of a semiconductor structure. Semiconductor structure 10a comprises structure layers 18a . . . 18g. Structure layer 18a comprises electrically conductive contacts 14a and 14b formed within an insulator layer 16 (e.g., an oxide layer). Structure layer 18a may be connected (i.e., via electrically conductive contacts 14a and 14b) to an electrical device (e.g., a transistor, a field effect transistor, a resistor, a capacitor, etc) on a semiconductor substrate (e.g., a semiconductor wafer). Structure layer 18b is formed over and in contact with structure layer 18a. Structure layer 18b comprises electrically conductive wires 1c and 1d formed within an insulator layer 22a. Electrically conductive wires 1c and 1d are electrically connected to electrically conductive contacts 14a and 14b respectively. Structure layer 18c is formed over and in contact with structure layer 18b. Structure layer 18c comprises electrically conductive wires 2d and 2e and electrically conductive structures 1a and 1b (e.g., electrically conductive vias) formed within an insulator layer 22b. Electrically conductive structure 1a electrically connects electrically conductive wire 2d to electrically conductive wire 1c. Electrically conductive structure electrically 1b electrically connects electrically conductive wire 2e to electrically conductive wire 1d. Structure layer 18d is formed over and in contact with structure layer 18c. Structure layer 18d comprises electrically conductive wires 3c and 3d and electrically conductive structures 2a . . . 2c (e.g., electrically conductive vias) formed within an insulator layer 22c. Electrically conductive structure 2a electrically connects electrically conductive wire 3c to electrically conductive wire 2d. Electrically conductive structures 2b and 2c electrically connect electrically conductive wire 3d to electrically conductive wire 2e. Structure layer 18e is formed over and in contact with structure layer 18d. Structure layer 18e comprises electrically conductive wires 4c . . . 4g and electrically conductive structures 3a and 3b (e.g., electrically conductive vias) formed within an insulator layer 22d. Electrically conductive structures 3a and 3b electrically connects electrically conductive wire 4g to electrically conductive wire 3d. Structure layer 18f is formed over and in contact with structure layer 18e. Structure layer 18f comprises electrically conductive wire 5b and electrically conductive structures 4a and 4b (e.g., electrically conductive vias) formed within an insulator layer 22e. Electrically conductive structures 4a and 4b electrically connects electrically conductive wire 5b to electrically conductive wire 4g. Structure layer 18g is formed over and in contact with structure layer 18f. Structure layer 18g comprises electrically conductive wires 6a . . . 6d and electrically conductive structure 5a (e.g., electrically conductive via) formed within an insulator layer 22f. Electrically conductive structure 5a electrically connects electrically conductive wire 6a to electrically conductive wire 5b. Each of structure layers 18a . . . 18g may comprise a single layer (i.e., as illustrated in FIG. 1). Alternatively, each of structure layers 18a . . . 18g may comprise multiple layers. For example, structure layer 18g could comprise a first insulating layer (i.e., comprising electrically conductive structure 5a) and a second insulating layer (i.e., comprising electrically conductive wires 6a ... 6d). Each of insulator layers 16 and 22a ... 22f may comprise any type of insulator materials including, inter alia, oxide (e.g., silicon dioxide, doped silicon dioxide, undoped silicon dioxide, etc), silicon nitride, boro-phospho-silicate glass, borosilicate glass, phosphosilicate glass, or any combination thereof. Each of insulator layers 16 and 22a ... 22f may comprise a same type of insulator material. Alternatively, each of insulator layers 16 and 22a ... 22f may comprise a different type of insulator material. For example insulator layer 22a may comprise an oxide material, insulator layer 22b may comprise silicon nitride, insulator layer 22c may comprise borosilicate glass, etc. Each of electrically conductive wires 1c, 1d, 2d, 2e, 3c, 3d, 4c ... 4g, 5b, and 6a ... 6d may comprise any type of electrically conductive material including, inter alia, copper, aluminum, nickel, titanium, lead, etc. Each of electrically conductive wires 1c, 1d, 2d, 2e, 3c, 3d, 4c ... 4g, 5b, and 6a ... 6d may comprise a same type of electrically conductive material. Alternatively, each of electrically conductive wires 1c, 1d, 2d, 2e, 3c, 3d, 4c ... 4g, 5b, and 6a ... 6d may comprise a different type of electrically conductive material. For example electrically conductive wire 1c may comprise copper, electrically conductive wire 1d may comprise aluminum, electrically conductive wire 2d may comprise nickel, etc. Each of electrically conductive structures 1a, 1b, 2a ... 2c, 3a, 3b, 4a, 4b, and 5a may comprise any type of electrically conductive material including, inter alia, copper, aluminum, nickel, titanium, lead, etc. Each of electrically conductive structures 1a, 1b, 2a ... 2c, 3a, 3b, 4a, 4b, and 5a may comprise a same type of electrically conductive material. Alternatively, each of electrically conductive structures 1a, 1b, 2a ... 2c, 3a, 3b, 4a, 4b, and 5a may comprise a different type of electrically conductive material. For example electrically conductive structure 1a may comprise copper, electrically conductive structure 1b may comprise aluminum, electrically conductive structure 2a may comprise nickel, etc.

Semiconductor structure 10a may require an engineering change order (ECO) in order to modify existing circuitry, repair a design problem, implement new internal connections, etc. An ECO may be implemented by adding a new layer(s) (e.g., comprising electrically conductive wires and electrically conductive structures (e.g., vias)) and/or modifying existing layers in an existing design for a semiconductor structure (e.g., semiconductor structure 10a) and generating a new semiconductor structure (e.g., semiconductor structure 10b in FIG. 2 as described, infra) comprising the new and/or modified layers. Adding a new layer(s) (e.g., comprising electrically conductive wires and electrically conductive structures (e.g., vias)) and/or modifying existing layers in an existing design for a semiconductor structure may provide new connections and break existing connections in the existing design. Adding a new layer may require adding a new wiring sub-layer, a new via sub-layer, and modifying an existing layer in order to provide connections between existing circuitry and new layers (i.e., comprising wires). A new layer may be added at specified insertion point 28a.

Figure 2:
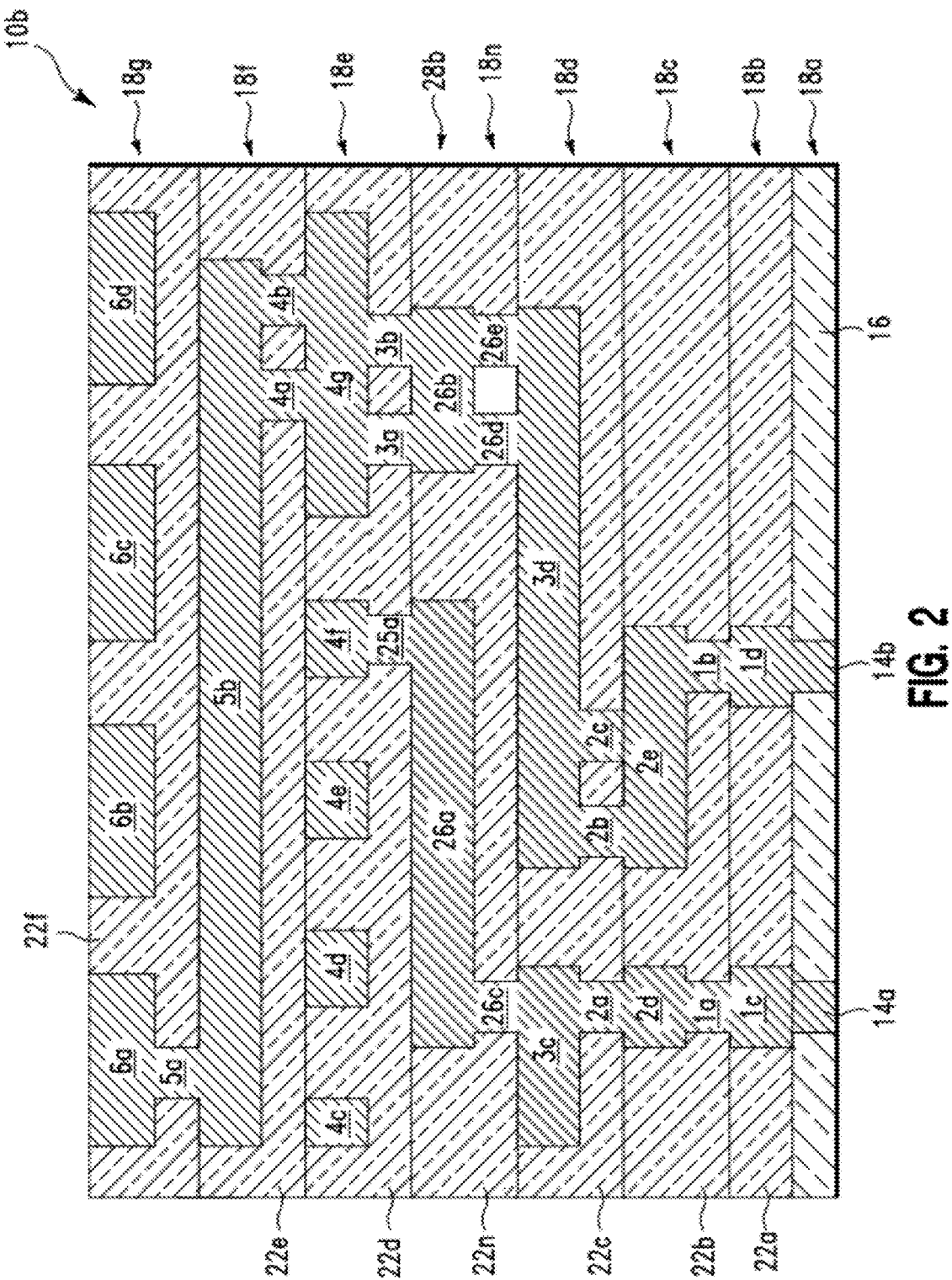
FIG. 2 illustrates a cross sectional view of a second semiconductor structure, in accordance with embodiments of the present invention.

FIG. 2 illustrates a cross sectional view of a semiconductor structure 10b, in accordance with embodiments of the present invention. Semiconductor 10b is a modified semiconductor structure (i.e., modified from semiconductor structure 10a of FIG. 1) after an ECO has been implemented with respect to semiconductor structure 10a of FIG. 1. In contrast with semiconductor structure 10a of FIG. 1, Semiconductor structure 10b of FIG. 2 comprises an additional structure layer 18n and structure 18e has been modified in order to connect to additional structure layer 18n. Structure layer 18e has been modified (i.e., from semiconductor structure 10a of FIG. 1) such that a new electrically conductive structure 25a (e.g., a via) has been added to structure layer 18e. New electrically conductive structure 25a may comprise any type of electrically conductive material including, inter alia, copper, aluminum, nickel, titanium, lead, etc. New electrically conductive structure 25a may comprise a same type of electrically conductive material as any of electrically conductive structures 1a, 1b, 2a ... 2c, 3a, 3b, 4a, 4b, and 5a. Alternatively, new electrically conductive structure 25a may comprise a different type of electrically conductive material from any of electrically conductive structures 1a, 1b, 2a ... 2c, 3a, 3b, 4a, 4b, and 5a. For example new electrically conductive structure 25a may comprise copper and electrically conductive structure 1a may comprise aluminum. Additional structure layer 18n is formed in between structure layer 18d and structure layer 18e at insertion point 28b (i.e., an insertion point location associated with insertion point 28a of FIG. 1). Additional structure layer 18n comprises electrically conductive wires 26a and 26b and electrically conductive structures 26c ... 26e (e.g., electrically conductive via) flamed within an insulator layer 22n. Structure layer 18n may comprise a single layer (i.e., as illustrated in FIG. 2). Alternatively, structure layer 18n may comprise multiple layers. For example, structure layer 18n could comprise a first insulating layer (i.e., comprising electrically conductive structures 26 ... 26e) and a second insulating layer (i.e., comprising electrically conductive wires 26a and 26b). Electrically conductive wires 26a and 26b and electrically conductive structures 26c ... 26e may comprise any type of electrically conductive material including, inter alia, copper, aluminum, nickel, titanium, lead, etc. Electrically conductive structures 26c ... 26e may comprise a same type of electrically conductive material as any of electrically conductive structures 1a, 1b, 2a ... 2c, 3a, 3b, 4a, 4b, 25a, and 5a. Alternatively, electrically conductive structures 26c ... 26e may comprise a different type of electrically conductive material from any of electrically conductive structures 1a, 1b, 2a ... 2c, 3a, 3b, 4a, 4b, 25a, and 5a. Electrically conductive wires 26a and 26b may comprise a same type of electrically conductive material as electrically conductive wires 1c, 1d, 2d, 2e, 3c, 3d, 4c ... 4g, 5b, and 6a ... 6d. Alternatively, electrically conductive wires 26a and 26b may comprise may comprise a different type of electrically conductive material from electrically conductive wires 1c, 1d, 2d, 2e, 3c, 3d, 4c ... 4g, 5b, and 6a ... 6d. Insulator layers 22n may comprise any type of insulator material including, inter alia, oxide (e.g., silicon dioxide, doped silicon dioxide, undoped silicon dioxide, etc), silicon nitride, boro-phospho-silicate glass, borosilicate glass, phosphosilicate glass, or any combination thereof. Electrically conductive structure 26c electrically connects electrically conductive wire 26a to electrically conductive wire 3c. Electrically conductive structure 25a electrically connects electrically conductive wire 26a to electrically conductive wire 4f. Electrically conductive structures 26d and 26e electrically connect electrically conductive wire 26b to electrically conductive wire 3d. Electrically conductive structures 3a and 3b electrically connect electrically conductive wire 26b to electrically conductive wire 4g. Additional structure layer 18n may comprise a plurality of sub-layers each comprising electrically conductive sub-wires, electrically conductive sub-structures and an insulator sub-layer. Each insulator sub-layer may comprise a same or different material. Each electrically conductive sub-wire and electrically conductive sub-structure may comprise a same or different material. Although, the ECO illustrated in FIG. 2 only comprises a single additional structure layer 18n and a single modified structure layer 18e, note that an ECO may comprise a plurality of additional structure layers and/or modified structure layers. The additional structure layers and/or modified structure layers may be placed anywhere in semiconductor structure 10b. The additional structure layers may be placed in contact with each other at a same insertion point location. Alternatively, each of the additional structure layers may be placed in a non contiguous location with respect to each other such that the additional structure layers are placed at different insertion point locations and are not in contact with each other. Additionally, multiple ECOs may be implemented with respect to semiconductor structures 10a and 10b. The multiple ECOs may be comprised by a same ECO. Additionally, a single ECO may be divided into multiple ECOS requiring different layers on multiple levels.

In order to implement the ECO (i.e., addition of additional structure layer 18n with respect to semiconductor structure 10a of FIG. 1), layer insertion point 28b must be determined (i.e., an optimal insertion layer point at which all ECO modifications may be generated). Layer insertion point 28b should comprise a highest level (with respect to layer 18a) insertion point which will allow the ECO implementation. Wherever the decision to insert structure layer 18n is made, all connections above structure layer 18n may be broken at structure layer 18n because all sources and sinks originate and terminate at lower levels (with respect to layer 18a). The location decision depends on a particular design and access to connections. At lower levels (with respect to layer 18a), more signals may be accessed but there is likely more congestion and vias passing through. Additionally, a higher potential for affecting parasitic capacitance of fixed macros may be realized. Higher levels (with respect to layer 18a) have less signal access and feature sizes are larger. Multiple inserted layers (i.e., to implement the ECO) need not be contiguous with each other. ECOs that are implemented for timing reasons may drive a different approach to layer selection causing a lower level to be selected.

Figure 3:
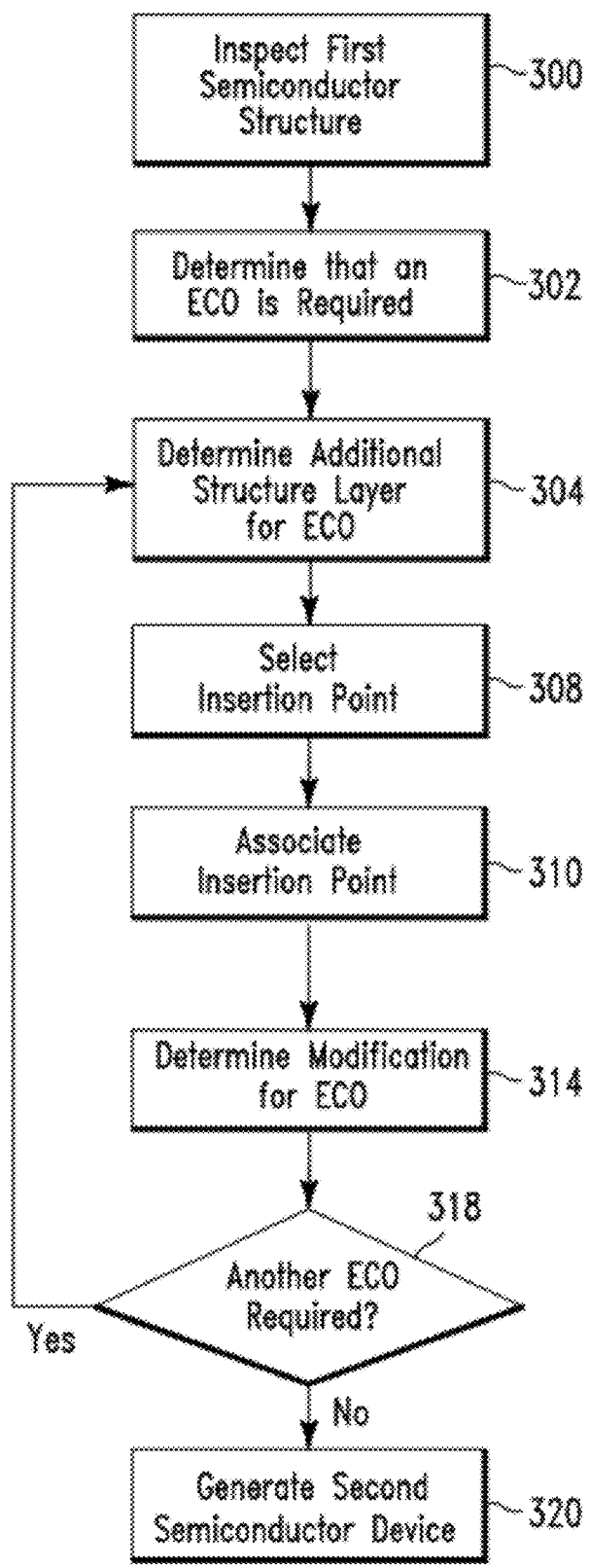
FIG. 3 illustrates an algorithm describing a process for forming the second semiconductor structure of FIG. 2, in accordance with embodiments of the present invention.

FIG. 3 illustrates an algorithm describing a process for forming semiconductor structure 10b of FIG. 2, in accordance with embodiments of the present invention. In step 300, first structures (e.g., electrically conductive structures 1a, 1b, 2a . . . 2c, 3a, 3b, 4a, 4b, 25a, 5a and electrically conductive wires 1c, 1d, 2d, 2e, 3c, 3d, 4c . . . 4g, 5b, and 6a . . . 6d in FIG. 1) within a first semiconductor device (e.g., semiconductor structure 10a of FIG. 1) are inspected. In step 302, it is determined (i.e., based on inspecting in step 300) that the first semiconductor device requires a first engineering change order (ECO). In step 304, it is determined that a first additional structure layer(s) (e.g., additional structure layer 18n in FIG. 2) is required to implement the first ECO. In step 308, a first insertion point location(s) (e.g., insertion point 28a in FIG. 1) within the first semiconductor device is selected. The first insertion point location(s) is selected for inserting said first additional structure layer. In step 310, first insertion point location (e.g., insertion point 28a in FIG. 1) is associated with a second insertion point location (e.g., insertion point 28b in FIG. 2) within a design for a second semiconductor device (e.g., semiconductor structure 10b of FIG. 2). In optional step 314, a modification for an existing layer (i.e., for implementing the ECO) is determined. In step 318, it is determined if another ECO for the first semiconductor device is required (or the single ECO is be divided into multiple ECOs requiring different layers on multiple levels). If in step 318, it is determined that another ECO for the first semiconductor device is required then steps 304-314 are repeated to implement another ECO. If in step 318, it is determined that another ECO for the first semiconductor device is not required then in step 320 the second semiconductor device is generated in accordance with the first ECO. The second semiconductor device comprises same structures in same locations as the first semiconductor device with the exception of the additional structure layer(s) and any modified structure layers (i.e., for implementing the first ECO).

Figure 4:
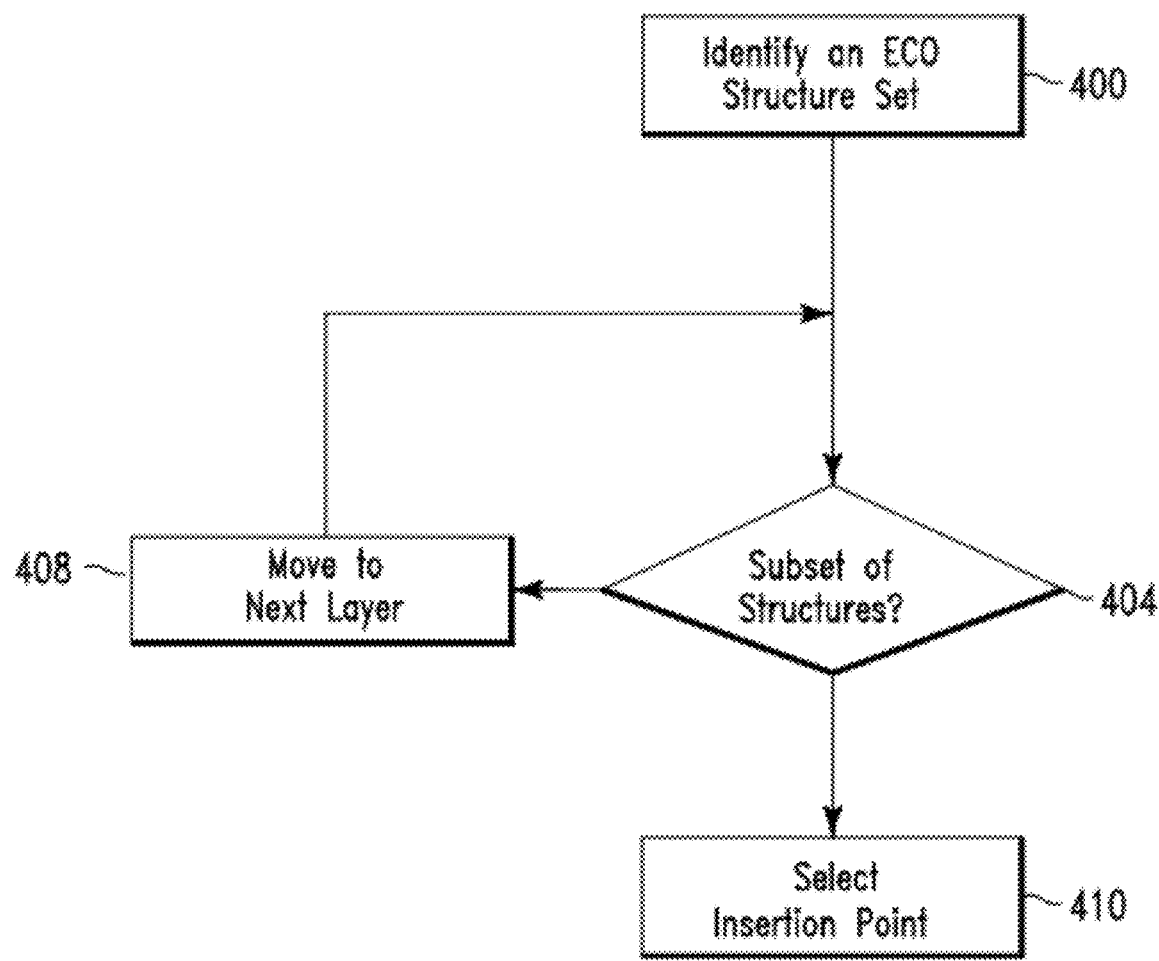
FIG. 4 illustrates an algorithm detailing a step of the algorithm of FIG. 3, in accordance with embodiments of the present invention.

FIG. 4 illustrates an algorithm detailing step 308 of the algorithm of FIG. 3, in accordance with embodiments of the present invention. The algorithm of FIG. 4 details a process for selecting an insertion point location for adding an additional structure layer in order to implement an ECO. In step 400, an ECO structure set is identified. The ECO structure set comprises all electrical structures within the first semiconductor device that require modification in accordance with the first ECO. Additionally, The ECO structure set comprises electrically connected to any other structures requiring modification. In step 404, it is determined if a subset of structures located below a selected structure layer is found. The process performed by step 404 comprises inspecting layers of the first semiconductor device that comprise at least one structure of the ECO structure set to determine subsets of structures located below a selected layer. As lower layers are inspected, additional subsets of structures are determined. Upon determining that no subsets below require modification, the inspection process is terminated (i.e., unless a timing process is necessary). If in step 404, it is determined that a subset of structures located below a selected structure layer is not found then in step 408, a next layer is inspected and step 404 is repeated. If in step 404, it is determined that a subset of structures located below a selected structure layer is found then in step 410, an insertion point location is selected. The insertion point location is located closest to a top surface of the first semiconductor device with respect to all other layers in the first semiconductor device.

Figure 5:
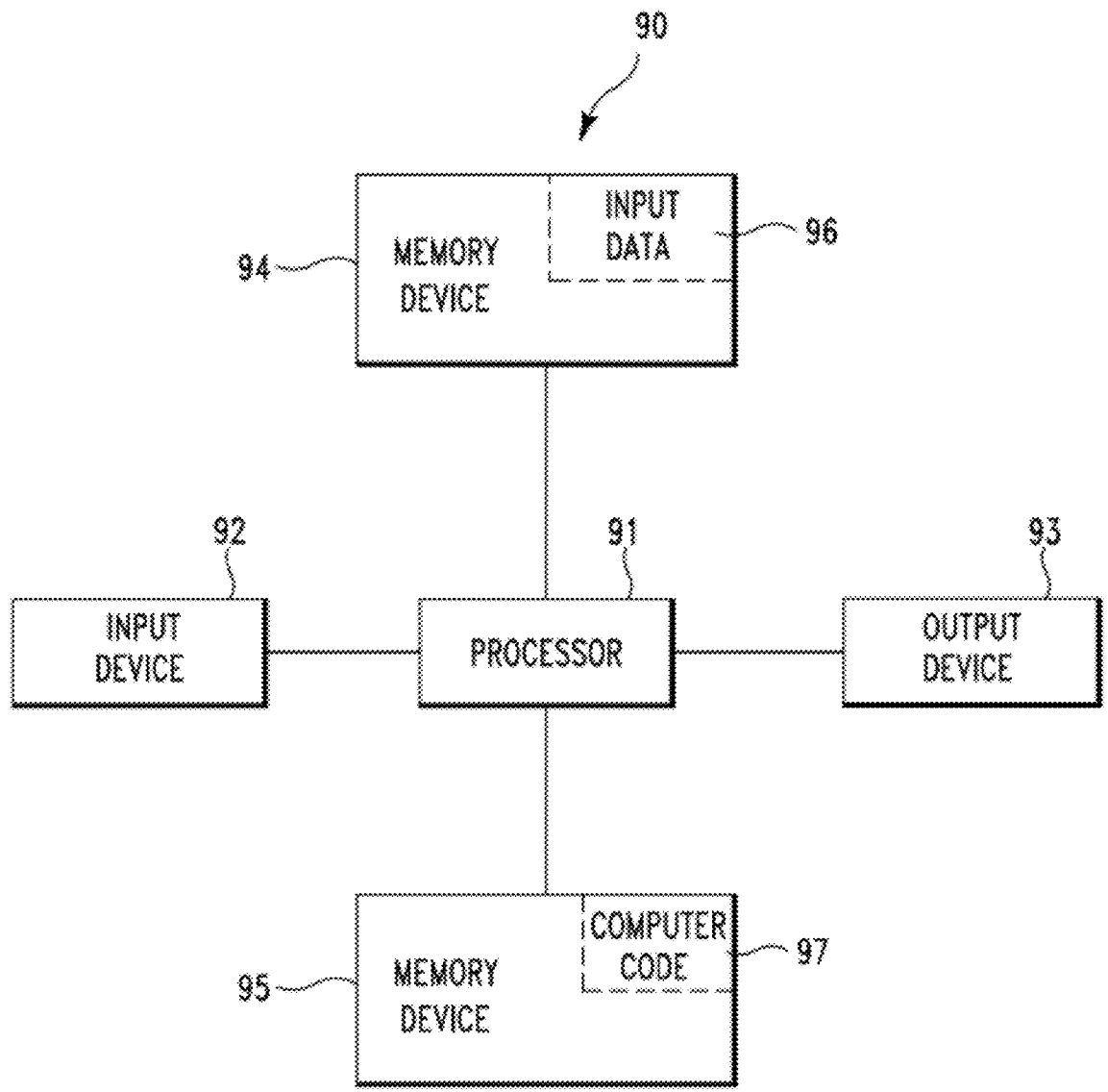
FIG. 5 illustrates a computer system used for implementing an ECO with respect to a first semiconductor structure and a second semiconductor structure, in accordance with embodiments of the present invention.

FIG. 5 illustrates a computer system 90 used for implementing an ECO with respect to a first semiconductor structure and a second semiconductor structure, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for implementing an ECO with respect to a first semiconductor structure and a second semiconductor structure (e.g., the algorithms of FIGS. 2 and 3). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to implement an ECO with respect to a first semiconductor structure and a second semiconductor structure. Thus the present invention discloses a process for deploying or integrating computing infrastructure, comprising integrating computer-readable code into the computer system 90, wherein the code in combination with the computer system 90 is capable of performing a method for implementing an ECO with respect to a first semiconductor structure and a second semiconductor structure. In another embodiment, the invention provides a business method that performs the process steps of the invention on a subscription, advertising, and/or fee basis. That is, a service provider, such as a Solution Integrator, could offer to implement an ECO with respect to a first semiconductor structure and a second semiconductor structure. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   inspecting, by a computer processor of a computing device, first structures within a first semiconductor device;
   determining based on said inspecting said first structures, that said first semiconductor device requires a first engineering change order (ECO) in order to modify existing circuitry within said first semiconductor device to repair a design problem or implement new internal connections;
   determining a first additional structure layer required to implement said first ECO;
   selecting, based on a parasitic capacitance associated with said first semiconductor device, a first insertion point location within said first semiconductor device for inserting said first additional structure layer, wherein said selecting said first insertion point location comprises:
      identifying an ECO structure set, wherein said ECO structure set comprises all electrical structures within said first semiconductor device that require modification in accordance with said first ECO;
      inspecting layers of said first semiconductor device that comprise at least one structure of said ECO structure set to determine subsets of structures located below a selected layer of said layers; and
      selecting based on said inspecting, an insertion layer of said layers that is located closest to a top surface of said first semiconductor device with respect to all other layers of said layers, wherein said first insertion point is located at said insertion layer;
   associating said first insertion point location with a second insertion point location within a design for a second semiconductor device, wherein said second semiconductor device is associated with said first semiconductor device; and
   generating said second semiconductor device in accordance with said first ECO, wherein said second semiconductor device comprises second structures, wherein said second structures comprise same structures as said first structures, wherein said second structures are formed in locations within said second semiconductor device that are associated with locations in said first semiconductor device comprising said first structures, wherein said second semiconductor device comprises said first additional structure layer configured to repair said design problem or implement said new internal connections, wherein said first additional structure layer comprises first electrically conductive structures formed within a first insulator layer, wherein said first additional structure layer is located within said second insertion point location, and wherein said first electrically conductive structures are electrically connected to a first group of structures of said second structures.

2. The method of claim 1, wherein said first additional structure layer comprises multiple structure layers, wherein said multiple structure layers comprise electrically conductive structures of said first electrically conductive structures formed within different insulator layers.

3. The method of claim 1, wherein said inspecting layers comprises:
   examining said subsets of structures; and
   determining that said subsets of structures do not require modification to implement said first ECO in said second semiconductor device.

4. The method of claim 1, further comprising:
   determining a first modification of a first structure layer of said first semiconductor device required to implement said first ECO; and
   associating said first modification of said first structure layer with a second structure layer within said design for said second semiconductor device, wherein said generating said second semiconductor device in accordance with said first ECO comprises generating said second structure layer in accordance with said first modification.

5. The method of claim 4, wherein said second structure layer comprises additional electrically conductive structures not comprised by said first structure layer.

6. The method of claim 4, wherein said second structure layer does not comprise additional electrically conductive structures that are comprised by said first structure layer.

7. The method of claim 1, wherein said first electrically conductive structures comprises a first electrically conductive structure and a second electrically conductive structure, wherein said first electrically conductive structures comprises a first electrically conductive material, wherein said second electrically conductive structure comprises a second electrically conductive material, and wherein said first electrically conductive material differs from said second electrically conductive material.

8. The method of claim 1, wherein said first additional structure layer within said second semiconductor device comprises a first sub layer formed over a second sub layer, wherein said first sub layer comprises first structures of said first group of structures formed in a first insulator sub layer, wherein said second sub layer comprises second structures of said first group of structures formed in a second insulator sub layer, and wherein said first structures comprise a first wire, wherein said second structures comprise a second wire, and wherein said second wire crosses below said first wire.

9. The method of claim 1, further comprising:
determining based on said inspecting said first structures, that said first semiconductor device requires a second ECO;
determining a second additional structure layer required to implement said second ECO;
selecting a third insertion point location within said first semiconductor device for inserting said second additional structure layer; and
associating said third insertion point location with a fourth insertion point location within said design for said second semiconductor device, wherein said generating said second semiconductor device is additionally in accordance with said second ECO, wherein said second semiconductor device comprises said second additional structure layer, wherein said second additional structure layer comprises second electrically conductive structures formed within a second insulator layer, wherein said second additional structure layer is located within said fourth insertion point location, and wherein said second electrically conductive structures are electrically connected to a second group of structures of said second structures.

10. The method of claim 9, wherein said second additional structure layer comprises multiple structure layers, wherein said multiple structure layers comprise electrically conductive structures of said second electrically conductive structures formed within different insulator layers.

11. The method of claim 9, wherein said first ECO and said second ECO are comprised by a same ECO.

12. The method of claim 9, wherein said first additional structure layer is located adjacent to said second additional structure layer such that said first additional structure layer is in contact with said second additional structure layer.

13. The method of claim 9, wherein said first additional structure layer is located in a noncontiguous position with respect to said second additional structure layer such original structure layers of said second semiconductor device are located between said first additional structure layer and said second additional structure layer.

14. The method of claim 1, wherein said first additional structure layer within said second semiconductor device comprises a first sub layer and a second sub layer, wherein said first sub layer is formed over said second sub layer, wherein said first sub layer comprises first conductive vias formed in a first insulator sub layer, wherein said second sub layer comprises conductive wires formed in a second insulator sub layer, wherein said conductive wires are electrically connected to said first conductive vias, and wherein said method further comprises:
determining a first modification of a first structure layer of said first semiconductor device required to implement said first ECO; and
associating said first modification of said first structure layer with a second structure layer within said design for said second semiconductor device, wherein said generating said second semiconductor device in accordance with said first ECO comprises generating said second structure layer in accordance with said first modification, wherein said second structure layer comprises second conductive vias formed within a third insulator sub layer, and wherein said second conductive vias are electrically connected to said conductive wires.

15. The method of claim 14, wherein said first insulator sub layer comprises a first insulator material, wherein said second insulator sub layer comprises a second insulator material differing from said first insulator material, and wherein said third insulator sub layer comprises a third insulator material differing from said first insulator material and said second insulator material.

16. The method of claim 14, wherein said first conductive vias and said second conductive vias comprise a first electrically conductive material, wherein said conductive wires comprise a second electrically conductive material, and wherein said first electrically conductive material differs from said second electrically conductive material.

17. The method of claim 14, wherein said first conductive vias comprise a first electrically conductive material, wherein said second conductive vias comprise a second electrically conductive material, wherein said conductive wires comprise a third electrically conductive material, wherein said first electrically conductive material differs from said second electrically conductive material, and wherein said third electrically conductive material differs from said first electrically conductive material and said second electrically conductive material.

18. The method of claim 1, wherein said first electrically conductive structures comprise structures selected from the group consisting of a wire and a via.

19. A computing system comprising a computer processor coupled to a computer-readable memory unit, said memory unit comprising a computer readable code configured to be executed by the computer processor to perform a method comprising:
inspecting, by the computer processor, first structures within a first semiconductor device;
determining based on said inspecting said first structures, that said first semiconductor device requires a first engineering change order (ECO) in order to modify existing circuitry to repair a design problem or implement new internal connections;
determining a first additional structure layer required to implement said first ECO;
selecting, based on a parasitic capacitance associated with said first semiconductor device, a first insertion point location within said first semiconductor device for inserting said first additional structure layer, wherein said selecting said first insertion point location comprises:
identifying an ECO structure set, wherein said ECO structure set comprises all electrical structures within said first semiconductor device that require modification in accordance with said first ECO;
inspecting layers of said first semiconductor device that comprise at least one structure of said ECO structure set to determine subsets of structures located below a selected layer of said layers; and
selecting based on said inspecting, an insertion layer of said layers that is located closest to a top surface of said first semiconductor device with respect to all other layers of said layers, wherein said first insertion point is located at said insertion layer;
associating said first insertion point location with a second insertion point location within a design for a second semiconductor device, wherein said second semiconductor device is associated with said first semiconductor device; and generating said second semiconductor device in accordance with said first ECO, wherein said second semiconductor device comprises second structures, wherein said second structures comprise same structures as said first structures, wherein said second structures are formed in locations within said second semiconductor device that are associated with locations in said first semiconductor device comprising said first structures, wherein said second semiconductor device comprises said first additional structure layer configured to repair said design problem or implement said new internal connections, wherein said first additional structure layer comprises first electrically conductive structures formed within a first insulator layer, wherein said first additional structure layer is located within said second insertion point location, and wherein said first electrically conductive structures are electrically connected to a first group of structures of said second structures.

* * * * *